United States Patent
Rajaram et al.

(10) Patent No.: US 8,479,180 B2
(45) Date of Patent: Jul. 2, 2013

(54) MAINTENANCE OF OVER THE AIR UPGRADEABLE WIRELESS COMMUNICATION DEVICE SOFTWARE

(75) Inventors: Gowri Rajaram, San Diego, CA (US); Diego Kaplan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 2018 days.

(21) Appl. No.: 11/552,104

(22) Filed: Oct. 23, 2006

(65) Prior Publication Data

US 2007/0049263 A1 Mar. 1, 2007

Related U.S. Application Data

(63) Continuation of application No. 09/916,460, filed on Jul. 26, 2001, now Pat. No. 7,159,214.

(51) Int. Cl.
*G06F 9/45* (2006.01)

(52) U.S. Cl.
USPC ............... 717/151; 717/153; 717/159

(58) Field of Classification Search
USPC ............... 717/151, 153, 159; 455/418
See application file for complete search history.

(56) References Cited

U.S. PATENT DOCUMENTS

| | | | |
|---|---|---|---|
| 5,046,082 A | 9/1991 | Zicker et al. | |
| 5,337,255 A | 8/1994 | Seidel et al. | |
| 5,400,389 A | 3/1995 | Niiyama et al. | |
| 5,481,706 A | 1/1996 | Peek | |
| 5,507,009 A | 4/1996 | Grube et al. | |
| 5,600,823 A | 2/1997 | Sherer et al. | |
| 5,627,748 A * | 5/1997 | Baker et al. | 717/141 |
| 5,673,317 A | 9/1997 | Cooper | |
| 5,699,275 A | 12/1997 | Beasley et al. | |
| 5,715,462 A | 2/1998 | Iwamoto et al. | |
| 5,734,904 A | 3/1998 | Kanamori et al. | |
| 5,771,386 A | 6/1998 | Baumbauer | |
| 5,784,537 A | 7/1998 | Suzuki et al. | |
| 5,790,704 A | 8/1998 | Rao et al. | |
| 5,790,856 A | 8/1998 | Lillich | |
| 5,832,086 A | 11/1998 | Rosauer | |
| 5,835,778 A | 11/1998 | Yoshihara | |
| 5,875,242 A | 2/1999 | Glaser et al. | |
| 5,920,826 A | 7/1999 | Metso et al. | |

(Continued)

FOREIGN PATENT DOCUMENTS

| | | |
|---|---|---|
| DE | 19502728 | 8/1996 |
| DE | 19543843 | 5/1997 |

(Continued)

OTHER PUBLICATIONS

Yeo, et al. "Performance Optimization over Channel Model for a Low Rate Wireless Personal Area Network", 2008, IEEE, p. 154-159.*

(Continued)

*Primary Examiner* — Qamrun Nahar

(57) ABSTRACT

Disclosed is a system and method for maintaining software instructions stored in a wireless communications device memory. The software is organized using code sections, where each code section is in a contiguous portion of memory and relocatable independently of other code sections. Maintenance includes the ability to run a unique software component called a compactor while the normal system is not in executable form. The compactor expands, compresses, and relocates code sections to allow downloaded code to be incorporated into the system code base.

19 Claims, 13 Drawing Sheets

U.S. PATENT DOCUMENTS

| | | | |
|---|---|---|---|
| 5,930,704 | A | 7/1999 | Kay |
| 5,938,766 | A | 8/1999 | Anderson et al. |
| 5,960,356 | A | 9/1999 | Alperovich et al. |
| 5,974,312 | A | 10/1999 | Hayes, Jr. et al. |
| 6,018,543 | A | 1/2000 | Blois et al. |
| 6,023,620 | A | 2/2000 | Hansson |
| 6,026,400 | A | 2/2000 | Suzuki |
| 6,047,071 | A | 4/2000 | Shah |
| 6,138,009 | A | 10/2000 | Birgerson |
| 6,138,153 | A | 10/2000 | Collins, III et al. |
| 6,145,098 | A | 11/2000 | Nouri et al. |
| 6,195,546 | B1 | 2/2001 | Leung et al. |
| 6,247,065 | B1 | 6/2001 | Greenspan et al. |
| 6,272,333 | B1 | 8/2001 | Smith |
| 6,275,694 | B1 | 8/2001 | Yoshida et al. |
| 6,308,061 | B1 | 10/2001 | Criss et al. |
| 6,351,636 | B2 | 2/2002 | Shaffer et al. |
| 6,415,266 | B1 | 7/2002 | Do |
| 6,442,660 | B1 * | 8/2002 | Henerlau et al. ............... 711/165 |
| 6,449,476 | B1 * | 9/2002 | Hutchison et al. ............ 455/418 |
| 6,457,174 | B1 | 9/2002 | Kuroda et al. |
| 6,460,070 | B1 | 10/2002 | Turek et al. |
| 6,470,447 | B1 | 10/2002 | Lambert et al. |
| 6,493,549 | B1 | 12/2002 | Axelson et al. |
| 6,493,871 | B1 | 12/2002 | McGuire et al. |
| 6,498,789 | B1 | 12/2002 | Honda |
| 6,546,492 | B1 | 4/2003 | Walker et al. |
| 6,549,770 | B1 | 4/2003 | Marran |
| 6,578,056 | B1 | 6/2003 | Lamburt |
| 6,578,142 | B1 | 6/2003 | Anderson et al. |
| 6,622,017 | B1 | 9/2003 | Hoffman |
| 6,633,759 | B1 | 10/2003 | Kobayashi |
| 6,643,506 | B1 | 11/2003 | Criss et al. |
| 6,714,992 | B1 | 3/2004 | Kanojia et al. |
| 6,731,946 | B1 | 5/2004 | Stanwood et al. |
| 6,754,894 | B1 | 6/2004 | Costello et al. |
| 6,754,895 | B1 | 6/2004 | Bartel et al. |
| 6,763,252 | B2 | 7/2004 | Itazawa |
| 6,785,541 | B2 | 8/2004 | Martin |
| 6,950,847 | B2 | 9/2005 | Harrisville-Wolff et al. |
| 6,959,192 | B1 | 10/2005 | Cannon et al. |
| 6,990,660 | B2 | 1/2006 | Moshir et al. |
| 7,065,347 | B1 | 6/2006 | Vikse et al. |
| 2001/0000538 | A1 | 4/2001 | Kowaguchi |
| 2001/0005861 | A1 | 6/2001 | Mousseau et al. |
| 2001/0019953 | A1 | 9/2001 | Furukawa et al. |
| 2001/0027500 | A1 | 10/2001 | Matsunaga |
| 2001/0051519 | A1 | 12/2001 | Shirai |
| 2001/0054161 | A1 | 12/2001 | Wooddruff |
| 2002/0019973 | A1 | 2/2002 | Hayashida |
| 2002/0026634 | A1 | 2/2002 | Shaw |
| 2002/0065041 | A1 | 5/2002 | Lunsford et al. |
| 2002/0072359 | A1 | 6/2002 | Moles et al. |
| 2002/0077077 | A1 | 6/2002 | Rezvani et al. |
| 2002/0083142 | A1 | 6/2002 | Lagosanto et al. |
| 2002/0083143 | A1 | 6/2002 | Cheng |
| 2002/0131397 | A1 | 9/2002 | Patel et al. |
| 2002/0142762 | A1 | 10/2002 | Chmaytelli et al. |
| 2002/0152268 | A1 | 10/2002 | Kureshy et al. |
| 2002/0160763 | A1 | 10/2002 | Mittal et al. |
| 2002/0161796 | A1 | 10/2002 | Sylthe |
| 2002/0170039 | A1 | 11/2002 | Kovacevic |
| 2003/0014561 | A1 | 1/2003 | Cooper |
| 2003/0060189 | A1 | 3/2003 | Minear et al. |
| 2003/0195013 | A1 | 10/2003 | Zicker et al. |
| 2004/0158829 | A1 | 8/2004 | Beresin et al. |
| 2004/0177072 | A1 | 9/2004 | Salminen et al. |
| 2004/0203768 | A1 | 10/2004 | Ylitalo et al. |
| 2004/0214551 | A1 | 10/2004 | Kim |
| 2004/0229644 | A1 | 11/2004 | Heie et al. |
| 2004/0240657 | A1 | 12/2004 | Camarillo |
| 2004/0249657 | A1 | 12/2004 | Kol et al. |
| 2004/0249768 | A1 | 12/2004 | Kontio et al. |
| 2004/0266422 | A1 | 12/2004 | Hotze et al. |
| 2005/0064847 | A1 | 3/2005 | Kirbas et al. |
| 2005/0079863 | A1 | 4/2005 | Macaluso |
| 2005/0209930 | A1 | 9/2005 | Coppinger et al. |

FOREIGN PATENT DOCUMENTS

| | | |
|---|---|---|
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 9809208 | 3/1998 |
| WO | WO 9922325 | 5/1999 |
| WO | WO 0067112 | 11/2000 |
| WO | WO 0073912 | 12/2000 |
| WO | WO 0074412 | 12/2000 |
| WO | WO 0135686 | 5/2001 |
| WO | WO 02058364 | 7/2002 |

OTHER PUBLICATIONS

Yong-Cai, et al. "The Technology for the Remote Upgrade Based on Wireless Network Optimization Monitoring System", 2010, IEEE, p. 211-213.*

Guiagoussou et al., "Implementation of a Diagnostic and Troubleshooting Multi-Agent System for Cellular Networks", Int'l J Network Mgmnt., pp. 221-237, Aug. 1999.

* cited by examiner

Wireless Device With OTA Updatable
Software Architecture

Wireless Device OTA Software
Maintenance System

Wireless Device OTA Software
Maintenance/Reorganizing Block Diagram

Wireless Device Memory Diagram

Figure 5
Code Section Address Table

326

| Code Section Address Table | |
|---|---|
| IDENTIFIERS | ADDRESSES |
| CS_1 | Start Address 1 (00100) |
| CS_2 | Start Address 2 (00200) |
| ... | ... |
| CS_n | Start Address n (00700) |
| PM | Start Address p (01000) |

Symbol Library 1

| Symbol Offset Address Table |||
| Symbol ID | Code Section ID | Offset |
| --- | --- | --- |
| X_1 | CS_1 | O3 |
| Y_1 | CS_1 | 15 |
| P_1 | CS_2 | 11 |
| Q_1 | CS_2 | 33 |
| AA_3 | CS_2 | 47 |
| ⋮ | ⋮ | ⋮ |

Symbol Offset Address Table

Exemplar Compacting Results

Exemplar
Compaction
Action

Exemplar
Compaction
Action

Exemplar
Compaction
Action

Exemplar
Compaction
Action

Exemplar
Compaction
Action

Reorganizing Software In A
Wireless Communications
Device

Reorganizing Software In A
Wireless Communications
Device

Further Exemplar For Reorganizing Software In A Wireless Communications Device

MAINTENANCE OF OVER THE AIR UPGRADEABLE WIRELESS COMMUNICATION DEVICE SOFTWARE

RELATED APPLICATIONS

This application is a continuation of application Ser. No. 09/916,460, filed on Jul. 26, 2001 now U.S. Pat. No. 7,159,214, the disclosure of which is incorporated by reference.

TECHNICAL FIELD

This disclosure generally relates to wireless communications devices and, more particularly, to a system and method for maintaining software in the system software of a wireless communication device in the field, updated via an airlink interface.

DESCRIPTION OF THE RELATED ART

It is not uncommon to release software updates for phones that are already in the field. These updates may relate to problems found in the software once the phones have been manufactured and distributed to the public. Some updates may involve the use of new features on the phone, or services provided by the service provider. Yet other updates may involve regional problems, or problems associated with certain carriers. For example, in certain regions the network layout of carriers may impose airlink interface conditions on the handset that cause the handset to demonstrate unexpected behavior such as improper channel searching, improper call termination, improper audio, or the like.

The traditional approach to such updates has been to recall the wireless communications device, also referred to herein as a wireless device, phone, telephone, or handset, to the nearest carrier retail/service outlet, or to the manufacturer to process the changes. The costs involved in such updates are extensive and eat into the bottom line. Further, the customer is inconvenienced and likely to be irritated. Often times, the practical solution is to issue the customer new phones.

It would be advantageous if wireless communications device software could be upgraded cheaply, and without inconvenience to the customer.

It would be advantageous if wireless communications device software could be upgraded without the customer losing the use of their phones for a significant period of time.

It would be advantageous if wireless communications device software could be updated with a minimum of technician service time, or without the need to send the device into a service facility.

It would be advantageous if the wireless device system software could be differentiated into code sections, so that only specific code sections of system software would need to be replaced, to update the system software. It would be advantageous if these code sections could be communicated to the wireless device via the airlink.

It would be advantageous if the system software could be updated with code sections larger in size than the currently residing code sections. It would also be advantageous if the system software could be rearranged to accommodate these larger updated code sections.

SUMMARY

Wireless communications device software updates give customers the best possible product and user experience. An expensive component of the business involves the recall of handsets to update the software. These updates may be necessary to offer the user additional services or to address problems discovered in the use of the phone after it has been manufactured. The present disclosure includes exemplar apparatus and methods to make it possible to practically upgrade handset software in the field, via the airlink interface, when the upgrade code sections differ in size as compared to the code sections they are replacing.

Accordingly, a method is provided for reorganizing software instructions stored in a wireless communications device memory. The method comprises: storing wireless device system software in a plurality of current code sections with the start of code sections at corresponding start addresses by creating a second plurality of contiguously addressed memory blocks, identifying each memory block with a corresponding code section, and storing code sections in identified memory blocks; receiving a new code section via a wireless communications device air interface; identifying a current code section for updating; calculating the code section sizes; in response to calculating the code section sizes, generating a compaction schedule; resizing current code sections; following the resizing of the current code sections, changing the code section start addresses; temporarily moving code sections into a file system section; replacing the identified current code section with the new code section by storing the code sections from the file system section into memory blocks to maintain contiguous addressing, in response to the compaction schedule; and, executing the updated system software.

Additional details of the above-described method for reorganizing software instructions in wireless device system software, and a wireless device system for reorganizing software instructions are presented in detail below.

BRIEF DESCRIPTION OF THE DRAWINGS

FIG. 5 is a table representing the code section address table of FIG. 3.

DETAILED DESCRIPTION

Some portions of the detailed descriptions that follow are presented in terms of procedures, steps, logic blocks, codes, processing, and other symbolic representations of operations on data bits within a wireless device microprocessor or memory. These descriptions and representations are the means used by those skilled in the data processing arts to most effectively convey the substance of their work to others skilled in the art. A procedure, microprocessor executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor based wireless device. It has proven convenient at times, principally for reasons of common usage, to refer to these signals as bits, values, elements, symbols, characters, terms, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "connecting" or "translating" or "displaying" or "prompting" or "determining" or "displaying" or "recognizing" or the like, refer to the action and processes of in a wireless device microprocessor system that manipulates and transforms data represented as physical (electronic) quantities within the computer system's registers and memories into other data similarly represented as physical quantities within the wireless device memories or registers or other such information storage, transmission or display devices.

Figure 1:
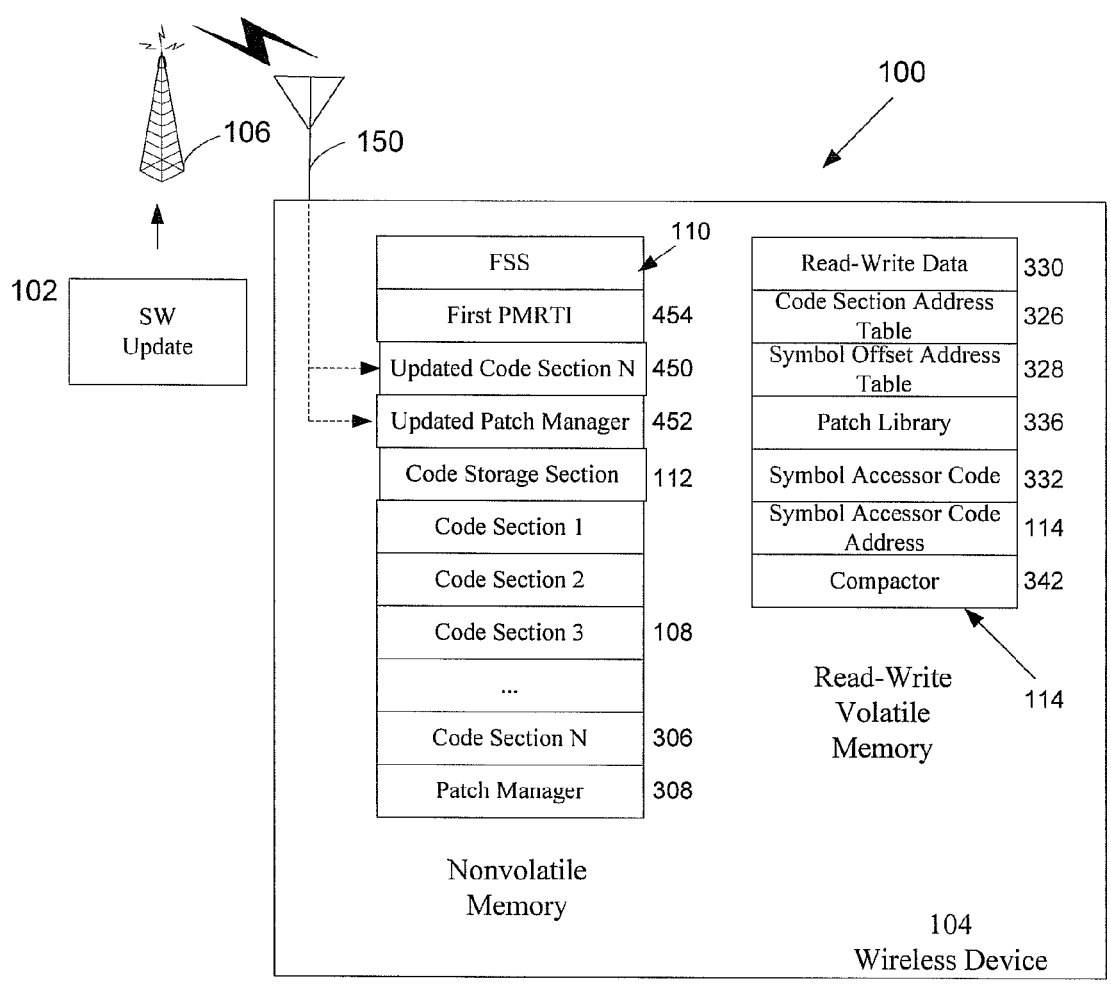
FIG. 1 is a schematic block diagram of the overall wireless device software maintenance system.

FIG. 1 is a schematic block diagram of the overall wireless device software maintenance system 100. The presently disclosed system software organization is discussed in detail below, following a general overview of the software maintenance system 100. The general system 100 describes a process of delivering system software updates and instruction sets (programs), and installing the delivered software in a wireless device. System software updates or patch manager run time instructions (PMRTI) that are more generally known as instruction sets, are created by the manufacturer of the handsets. The system software is organized into symbol libraries. The symbol libraries are arranged into code sections. When symbol libraries are to be updated, the software update 102 is transported as one or more code sections. The software update is broadcast to wireless devices in the field, of which wireless communications device 104 is representative, or transmitted in separate communications from a base station 106 using well known, conventional air, data or message transport protocols. The transport mechanism is not limited to any particular transportation format, as the wireless communications device can be easily modified to process any available over-the-air transport protocol for the purpose of receiving system software and PMRTI updates.

The system software can be viewed as a collection of different subsystems. Code objects can be tightly coupled into one of these abstract subsystems and the resulting collection can be labeled as a symbol library. This provides a logical breakdown of the code base and software patches and fixes can be associated with one of these symbol libraries. In most cases, a single update is associated with one, or at most two, symbol libraries. The rest of the code base, the other symbol libraries, remain unchanged.

The notion of symbol libraries provides a mechanism to deal with code and constants. The read-write (RW) data, on the other hand, fits into a unique individual RW library that contains RAM based data for all libraries.

Once received by the wireless device 104, the transported code section must be processed. This wireless device overwrites a specific code section of nonvolatile memory 108. The nonvolatile memory 108 includes a file system section (FSS) 110 and a code storage section 112. The code section is typically compressed before transport in order to minimize occupancy in the FSS 110. Often the updated code section will be accompanied by its RW data, which is another kind of symbol library that contains all the RW data for each symbol library. Although loaded in random access volatile read-write memory 114 when the system software is executing, the RW data always needs to be stored in the nonvolatile memory 108, so it can be loaded into random access volatile read-write memory 114 each time the wireless device is reset. This includes the first time RW data is loaded into random access volatile read-write memory. As explained in more detail below, the RW data is typically arranged with a patch manager code section.

The system 100 includes the concept of virtual tables. Using such tables, symbol libraries in one code section can be patched (replaced), without breaking (replacing) other parts of the system software (other code sections). Virtual tables execute from random access volatile read-write memory 114 for efficiency purposes. A code section address table and symbol offset address table are virtual tables.

The updated code sections are received by the wireless device 104 and stored in the FSS 110. A wireless device user interface (UI) will typically notify the user that new software is available. In response to UI prompts the user acknowledges the notification and signals the patching or updating operation. Alternately, the updating operation is performed automatically. The wireless device may be unable to perform standard communication tasks as the updating process is performed. The patch manager code section includes a nonvolatile read-write driver symbol library that is also loaded into random access volatile read-write memory 114. The non-volatile read-write driver symbol library causes code sections to be overwritten with updated code sections. The patch manager code section includes the read-write data, code section address table, and symbol offset address table, as well a symbol accessor code and the symbol accessor code address (discussed below). Portions of this data are invalid when updated code sections are introduced, and an updated patch manager code sections includes read-write data, a code section address table, and a symbol offset address table valid for the updated code sections. Once the updated code sections are loaded into the code storage section 112, the wireless device is reset. Following the reset operation, the wireless device can execute the updated system software. It should also be understood that the patch manager code section may include other symbol libraries that have not been discussed above. These other symbol libraries need not be loaded into read-write volatile memory 114.

Figure 2:
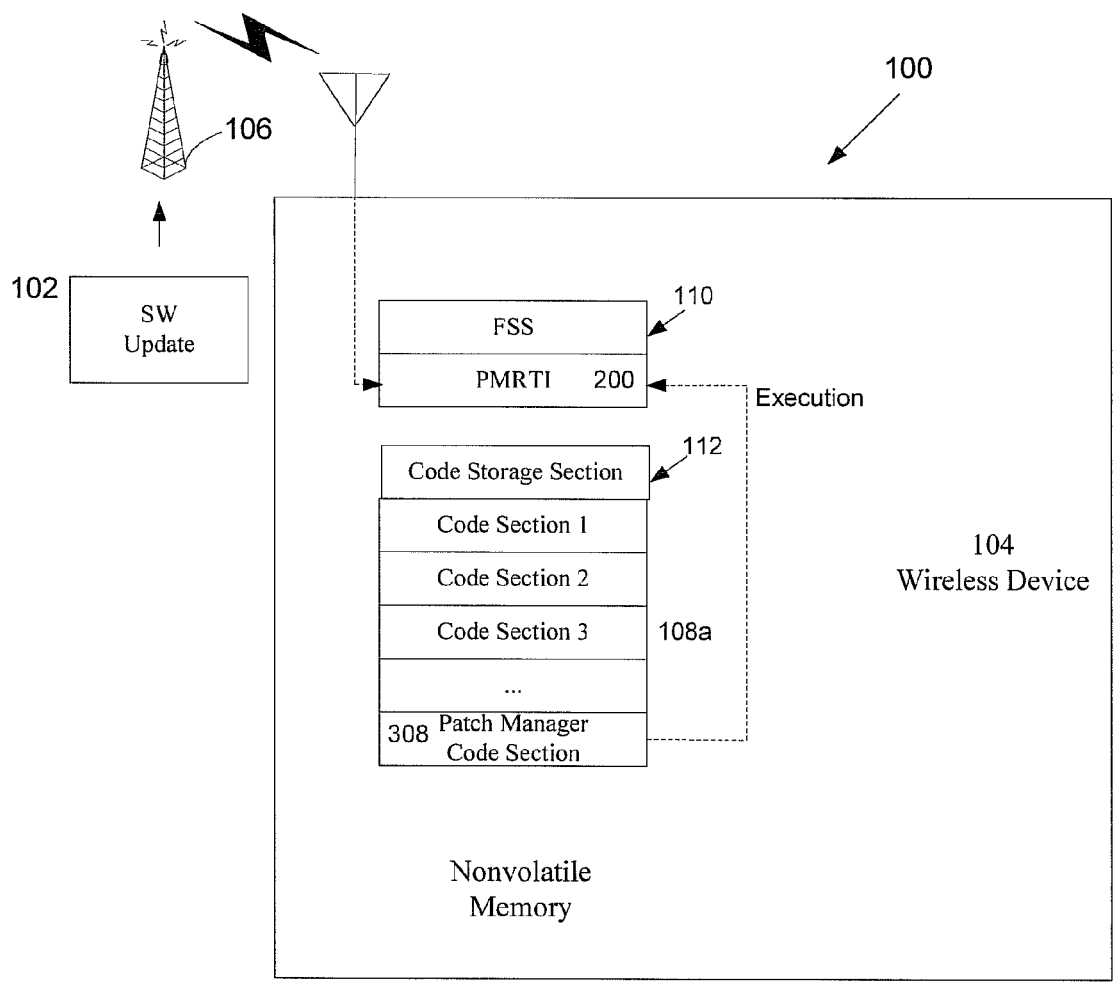
FIG. 2 is a schematic block diagram of the software maintenance system, highlighting the installation of instruction sets via the airlink interface.

FIG. 2 is a schematic block diagram of the software maintenance system 100, highlighting the installation of instruction sets via the airlink interface. In addition to updating system software code sections, the maintenance system 100 can download and install instructions sets, programs, or patch manager instruction sets (PMIS), referred to herein as patch manager run time instructions (PMRTI). The PMRTI code section 200 is transported to the wireless device 104 in the same manner as the above-described system software code sections. PMRTI code sections are initially stored in the FSS 110. A PMRTI code section is typically a binary file that may be visualized as compiled instructions to the handset. A PMRTI code section is comprehensive enough to provide for the performance of basic mathematical operations and the performance of conditionally executed operations. For example, an RF calibration PMRTI could perform the following operations:

IF RF CAL ITEM IS LESS THAN X
   EXECUTE INSTRUCTION
   ELSE
   EXECUTE INSTRUCTION

A PMRTI can support basic mathematical operations, such as: addition, subtraction, multiplication, and division. As with the system software code sections, the PMRTI code section may be loaded in response to UI prompts, and the wireless device must be reset after the PMRTI is loaded into code storage section 112. Then the PMRTI section can be executed. If the PMRTI code section is associated with any virtual tables or read-write data, an updated patch manager code section will be transported with the PMRTI for installation in the code storage section 112. Alternately, the PMRTI can be kept and processed from the FSS 110. After the handset 104 has executed all the instructions in the PMRTI section, the PMRTI section can be deleted from the FSS 110.

PMRTI is a very powerful runtime instruction engine. The handset can execute any instruction delivered to it through the PMRTI environment. This mechanism may be used to support RF calibrations and PRI updates. More generally, PMRTI can be used to remote debug wireless device software when software problems are recognized by the manufacturer or service provider, typically as the result of user complaints. PMRTI can also record data needed to diagnose software problems. PMRTI can launch newly downloaded system applications for data analysis, debugging, and fixes. PMRTI can provide RW data based updates for analysis and possible short term fix to a problem in lieu of an updated system software code section. PMRTI can provide memory compaction algorithms for use by the wireless device.

In some embodiments the organization of the system software into symbol libraries may impact the size of the volatile memory 114 and nonvolatile memory 108 required for execution. This is due to the fact that the code sections are typically larger than the symbol libraries arranged in the code sections. These larger code sections exist to accommodate updated code sections. Organizing the system software as a collection of libraries impacts the nonvolatile memory size requirement. For the same code size, the amount of nonvolatile memory used will be higher due to the fact that code sections can be sized to be larger than the symbol libraries arranged within.

Once software updates have been delivered to the wireless device, the software maintenance system 100 supports memory compaction. The compaction mechanism ensures that memory is optimally used and is well balanced for future code section updates, where the size of the updated code sections are unpredictable. The system 100 analyzes the code storage section as it is being patched (updated). The system 100 attempts to fit updated code sections into the memory space occupied by the code section being replaced. If the updated code section is larger than the code section being replaced, the system 100 compacts the code sections in memory 112. Alternately, the compaction can be calculated by the manufacturer or service provider, and compaction instructions can be transported to the wireless device 104.

Compaction can be a time consuming process owing to the complexity of the algorithm and also the vast volume of data movement. The compaction algorithm predicts feasibility before it begins any processing. UI prompts can be used to apply for permission from the user before the compaction is attempted.

In some embodiments, all the system software code sections can be updated simultaneously. A complete system software upgrade requires a large FSS 110.

Figure 3:
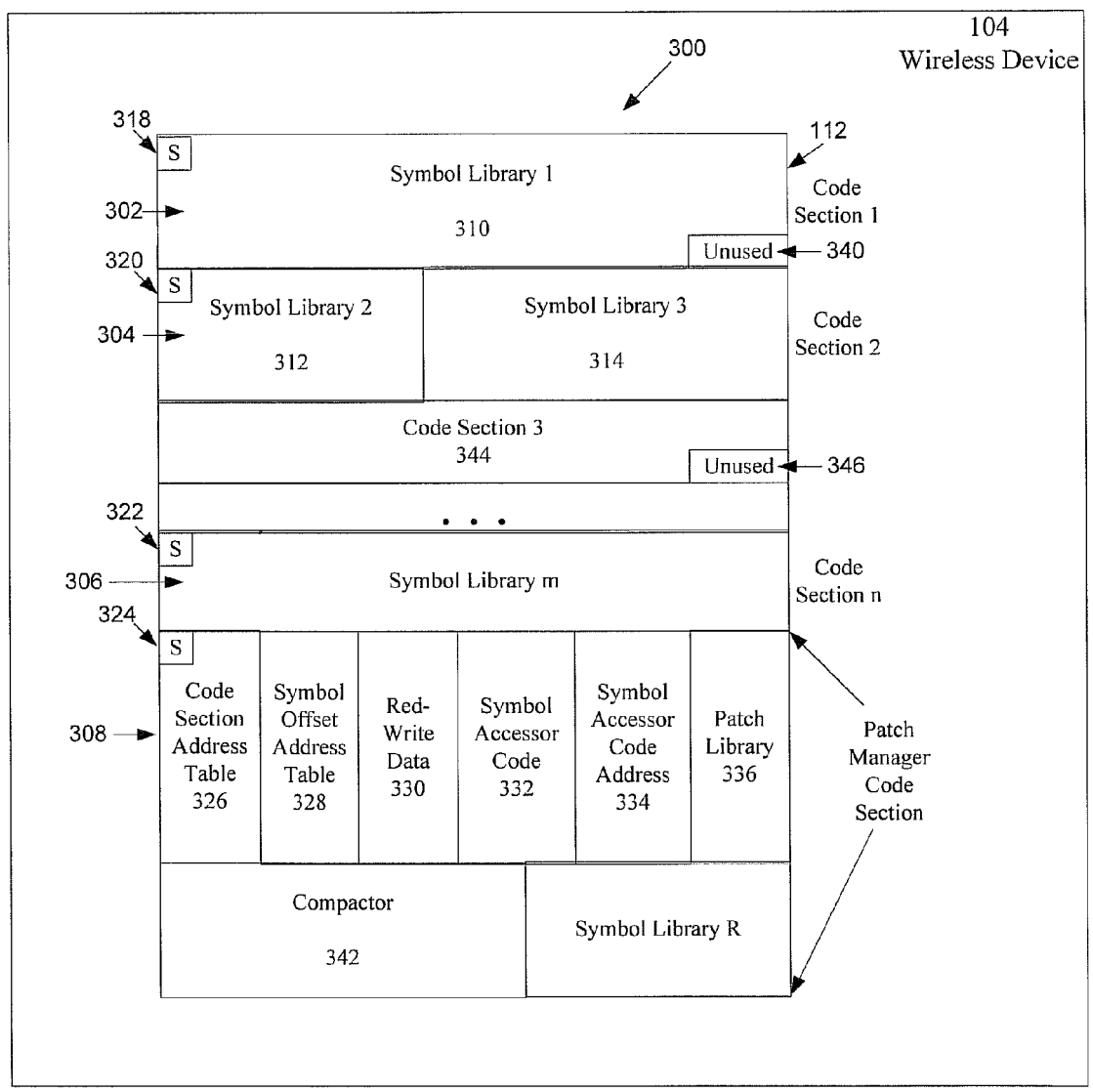
FIG. 3 is a schematic block diagram illustrating a system for reorganizing software instructions in a wireless communications device.

FIG. 3 is a schematic block diagram illustrating a system for reorganizing software instructions in a wireless communications device. The system 300 comprises a code storage section 112 in memory 108 including executable wireless device system software differentiated into a plurality of current code sections. Code section one (302), code section two (304), code section n (306), and a patch manager code section 308 are shown. However, the system is not limited to any particular number of code sections. Further, the system 300 further comprises a first plurality of symbol libraries arranged into the second plurality of code sections. Shown are symbol library one (310) arranged in code section one (302), symbol libraries two (312) and three (314) arranged in code section two (304), and symbol library m (316) arranged in code section n (306). Each library comprises symbols having related functionality. For example, symbol library one (310) may be involved in the operation of the wireless device liquid crystal display (LCD). Then, the symbols would be associated with display functions. As explained in detail below, additional symbol libraries are arranged in the patch manger code section 308.

Figure 4:
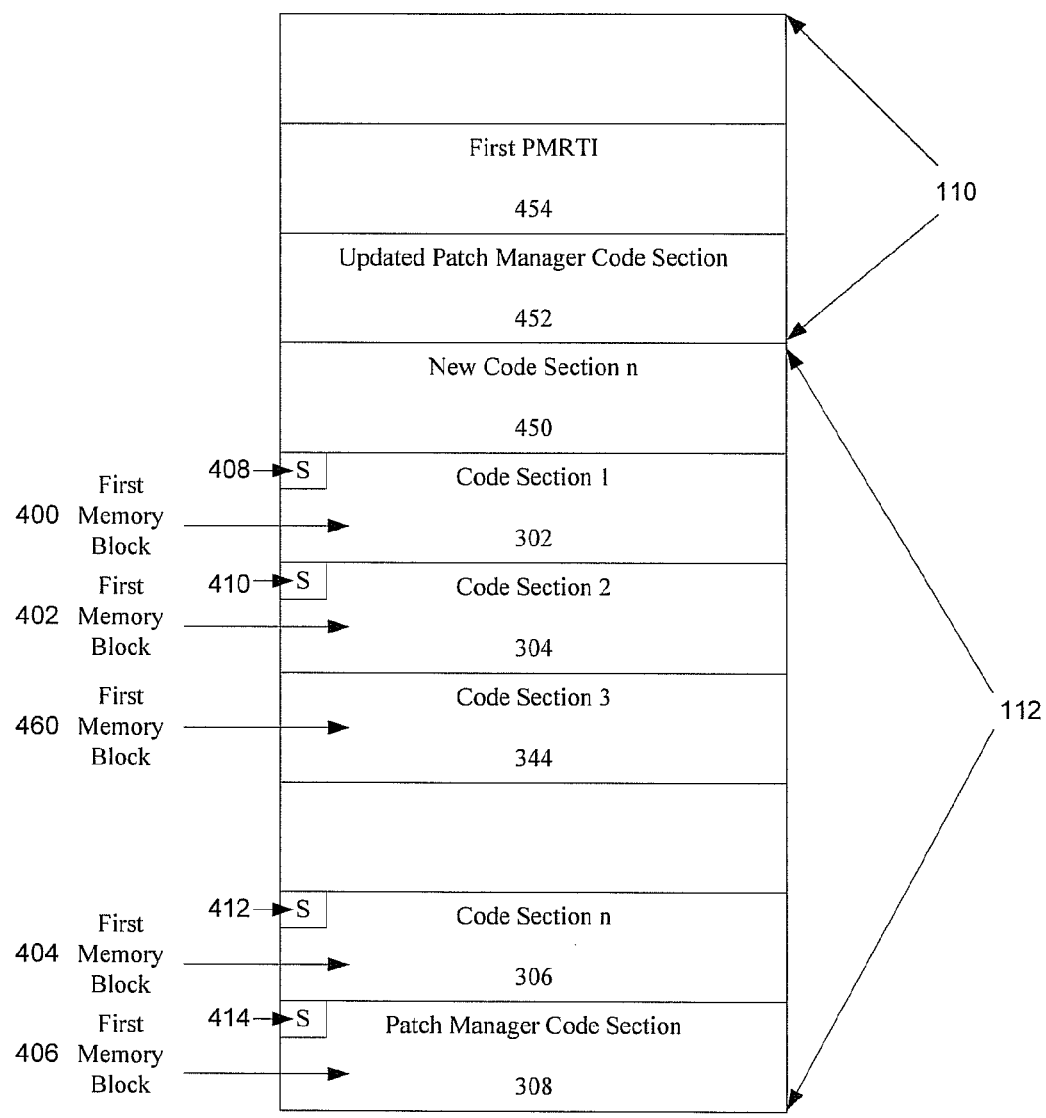
FIG. 4 is a schematic block diagram of the wireless device memory.

FIG. 4 is a schematic block diagram of the wireless device memory. As shown, the memory is the code storage section 112 of FIG. 1. The memory is a writeable, nonvolatile memory, such as Flash memory. It should be understood that the code sections need not necessarily be stored in the same memory as the FSS 110. It should also be understood that the presently disclosed system software structure could be enabled with code sections stored in a plurality of cooperating memories. The code storage section 112 includes a second plurality of contiguously addressed memory blocks, where each memory block stores a corresponding code section from the second plurality of code sections. Thus, code section one (302) is stored in a first memory block 400, code section two (304) in the second memory block 402, code section n (306) in the nth memory block 404, and the patch manager code section (308) in the pth memory block 406.

Contrasting FIGS. 3 and 4, the start of each code section is stored at corresponding start addresses in memory, and symbol libraries are arranged to start at the start of code sections. That is, each symbol library begins at a first address and runs through a range of addresses in sequence from the first address. For example, code section one (302) starts at the first start address 408 (marked with "S") in code storage section memory 112. In FIG. 3, symbol library one (310) starts at the start 318 of the first code section. Likewise code section two (304) starts at a second start address 410 (FIG. 4), and symbol library two starts at the start 320 of code section two (FIG. 3). Code section n (306) starts at a third start address 412 in code storage section memory 112 (FIG. 4), and symbol library m (316) starts at the start of code section n 322 (FIG. 3). The patch manager code section starts at pth start address 414 in code storage section memory 112, and the first symbol library in the patch manager code section 308 starts at the start 324 of the patch manager code section. Thus, symbol library one (310) is ultimately stored in the first memory block 400. If a code section includes a plurality of symbol libraries, such as code section two (304), the plurality of symbol libraries are stored in the corresponding memory block, in this case the second memory block 402.

In FIG. 3, the system software structure 300 further comprises a code section address table 326 as a type of symbol included in a symbol library arranged in the patch manager code section 308. The code section address table cross-references code section identifiers with corresponding code section start addresses in memory.

FIG. 5 is a table representing the code section address table 326 of FIG. 3. The code section address table 326 is consulted to find the code section start address for a symbol library. For example, the system 300 seeks code section one when a symbol in symbol library one is required for execution. To find the start address of code section one, and therefore locate the symbol in symbol library one, the code section address table 326 is consulted. The arrangement of symbol libraries in code sections, and the tracking of code sections with a table permits the code sections to be moved or expanded. The expansion or movement operations may be needed to install upgraded code sections (with upgraded symbol libraries).

Returning to FIG. 3, it should be noted that not every symbol library necessarily starts at the start of a code section. As shown, symbol library three (314) is arranged in code section two (304), but does not start of the code section start address 320. Thus, if a symbol in symbol library three (314) is required for execution, the system 300 consults the code section address table 326 for the start address of code section two (304). As explained below, a symbol offset address table permits the symbols in symbol library three (314) to be located. It does not matter that the symbols are spread across multiple libraries, as long as they are retained with the same code section.

As noted above, each symbol library includes functionally related symbols. A symbol is a programmer-defined name for locating and using a routine body, variable, or data structure. Thus, a symbol can be an address or a value. Symbols can be internal or external. Internal symbols are not visible beyond the scope of the current code section. More specifically, they are not sought by other symbol libraries, in other code sections. External symbols are used and invoked across code sections and are sought by libraries in different code sections. The symbol offset address table typically includes a list of all external symbols.

For example, symbol library one (310) may generate characters on a wireless device display. Symbols in this library would, in turn, generate telephone numbers, names, the time, or other display features. Each feature is generated with routines, referred to herein as a symbol. For example, one symbol in symbol library one (310) generates telephone numbers on the display. This symbol is represented by an "X", and is external. When the wireless device receives a phone call and the caller ID service is activated, the system must-execute the "X" symbol to generate the number on the display. Therefore, the system must locate the "X" symbol.

Figure 6:
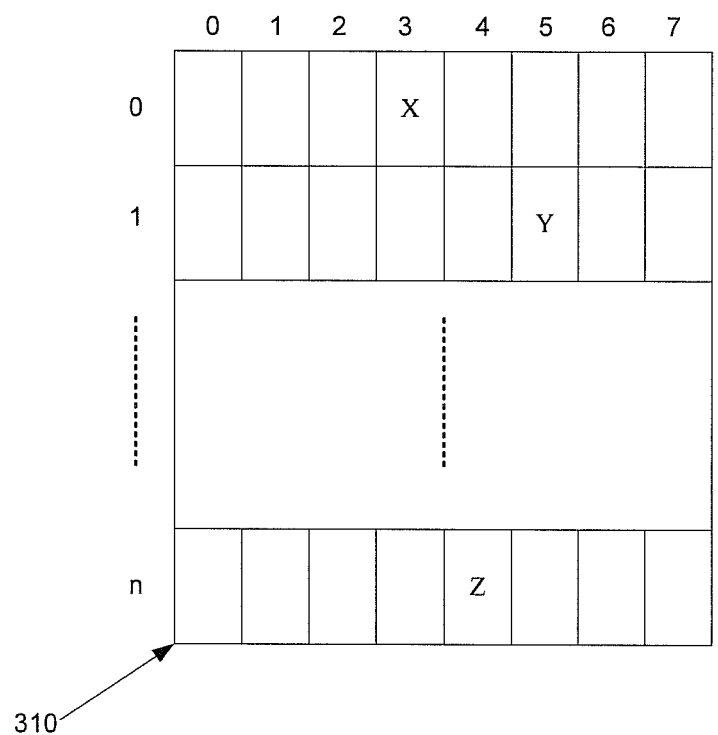
FIG. 6 is a detailed depiction of symbol library one of FIG. 3, with symbols.

FIG. 6 is a detailed depiction of symbol library one (310) of FIG. 3, with symbols. Symbols are arranged to be offset from respective code section start addresses. In many circumstances, the start of the symbol library is the start of a code section, but this is not true if a code section includes more than one symbol library. Symbol library one (310) starts at the start of code section one (see FIG. 3). As shown in FIG. 6, the "X" symbol is located at an offset of (03) from the start of the symbol library and the "Y" symbol is located at an offset of (15). The symbol offset addresses are stored in a symbol offset address table 328 in the patch manager code section (see FIG. 3).

Figures 7, 8:
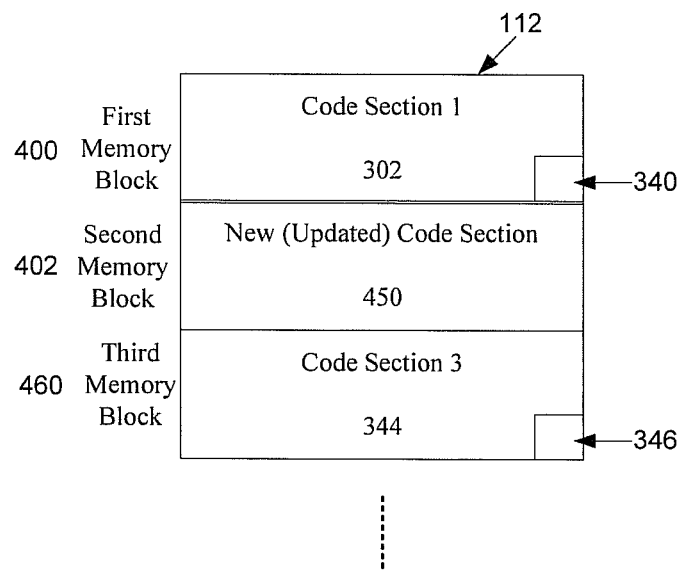
FIG. 7 is a table representing the symbol offset address table of FIG. 3.
FIG. 8 is a schematic block diagram illustrating the results of exemplary compacting operation.

FIG. 7 is a table representing the symbol offset address table 328 of FIG. 3. The symbol offset address table 328 cross-references symbol identifiers with corresponding offset addresses, and with corresponding code section identifiers in memory. Thus, when the system seeks to execute the "X" symbol in symbol library one, the symbol offset address table 328 is consulted to located the exact address of the symbol, with respect to the code section in which it is arranged.

Returning to FIG. 3, the first plurality of symbol libraries typically all include read-write data that must be consulted or set in the execution of these symbol libraries. For example, a symbol library may include an operation dependent upon a conditional statement. The read-write data section is consulted to determine the status required to complete the conditional statement. The presently disclosed system groups the read-write data from all the symbol libraries into a shared read-write section. In some embodiments the read-write data 330 is arranged in the patch manager code section 308. Alternately (not shown), the read-write data can be arranged in a different code section, code section n (306), for example.

The first plurality of symbol libraries also includes symbol accessor code arranged in a code section to calculate the address of a sought symbol. The symbol accessor code can be arranged and stored at an address in a separate code section, code section two (304), for example. However, as shown, the symbol accessor code 332 is arranged and stored at an address in the patch manager code section 308. The system software structure 300 further comprises a first location for storage of the symbol accessor code address. The first location can be a code section in the code storage section 112, or in a separate memory section of the wireless device (not shown). The first location can also be arranged in the same code section as the read-write data. As shown, the first location 334 is stored in the patch manager code section 308 with the read-write data 330, the symbol offset address table 328, the code section address table 326, and the symbol accessor code 332, and the patch library (patch symbol library) 336.

The symbol accessor code accesses the code section address table and symbol offset address tables to calculate, or find the address of a sought symbol in memory. That is, the symbol accessor code calculates the address of the sought symbol using a corresponding symbol identifier and a corresponding code section identifier. For example, if the "X" symbol in symbol library one is sought, the symbol accessor is invoked to seek the symbol identifier (symbol ID) X.sub.-1, corresponding to the "X" symbol (see FIG. 7). The symbol accessor code consults the symbol offset address table to determine that the X.sub.-1 symbol identifier has an offset of (03) from the start of code section one (see FIG. 6). The symbol accessor code is invoked to seek the code section identifier CS.sub.-1, corresponding to code section one. The symbol accessor code consults the code section address table to determine the start address associated with code section identifier (code section ID) CS.sub.-1. In this manner, the symbol accessor code determines that the symbol identifier X.sub.-1 is offset (03) from the address of (00100), or is located at address (00103).

The symbol "X" is a reserved name since it is a part of the actual code. In other words, it has an absolute data associated with it. The data may be an address or a value. The symbol identifier is an alias created to track the symbol. The symbol offset address table and the code section address table both work with identifiers to avoid confusion with reserved symbol and code section names. It is also possible that the same symbol name is used across many symbol libraries. The use of identifiers prevents confusion between these symbols.

Returning to FIG. 1, the system software structure 300 further comprises a read-write volatile memory 114, typically random access memory (RAM). The read-write data 330, code section address table 326, the symbol offset address table 328, the symbol accessor code 332, and the symbol accessor code address 334 are loaded into the read-write volatile memory 114 from the patch manager code section for access during execution of the system software. As is well known, the access times for code stored in RAM is significantly less than the access to a nonvolatile memory such as Flash.

Returning to FIG. 3, it can be noted that the symbol libraries need not necessarily fill the code sections into which they are arranged, although the memory blocks are sized to exactly accommodate the corresponding code sections stored within. Alternately stated, each of the second plurality of code sections has a size in bytes that accommodates the arranged symbol libraries, and each of the contiguously addressed memory blocks have a size in bytes that accommodates corresponding code sections. For example, code section one (302) may be a 100 byte section to accommodate a symbol library having a length of 100 bytes. The first memory block would be 100 bytes to match the byte size of code section one. However, the symbol library loaded into code section 1 may be smaller than 100 bytes. As shown in FIG. 3, code section one (302) has an unused section 340, as symbol library one (310) is less than 100 bytes. Thus, each of the second plurality of code sections may have a size larger than the size needed to accommodate the arranged symbol libraries. By "oversizing" the code sections, larger updated symbol libraries can be accommodated.

Contiguously addressed memory blocks refers to partitioning the physical memory space into logical blocks of variable size. Code sections and memory blocks are terms that are essentially interchangeable when the code section is stored in memory. The concept of a code section is used to identify a section of code that is perhaps larger than the symbol library, or the collection of symbol libraries in the code section as it is moved and manipulated.

As seen in FIG. 3, the system 300 includes a patch symbol library, which will be referred to herein as patch library 336, to arrange new code sections in the code storage section with the current code sections. The arrangement of new code sections with current code sections in the code storage section forms updated executable system software. The patch manager 336 not only arranges new code sections in with the current code sections, it also replaces code sections with updated code sections.

Returning to FIG. 4, the file system section 110 of memory 108 receives new code sections, such as new code section 450 and updated patch manager code section 452. The file system section also receives a first patch manager run time instruction (PMRTI) 454 including instructions for arranging the new code sections with the current code sections. As seen in FIG. 1, an airlink interface 150 receives new, or updated code sections, as well as the first PMRTI. Although the airlink interface 150 is being represented by an antenna, it should be understood that the airlink interface would also include an RF transceiver, baseband circuitry, and demodulation circuitry (not shown). The file system section 110 stores the new code sections received via the airlink interface 150. The patch library 336, executing from read-write volatile memory 114, replaces a first code section in the code storage section, code section n (306) for example, with the new, or updated code section 450, in response to the first PMRTI 454. Typically, the patch manager code section 308 is replaced with the updated patch manager code section 452. When code sections are being replaced, the patch library 336 over-writes the first code section, code section n (306) for example, in the code storage section 112 with the updated code sections, code section 450 for example, in the file system section 110. In the extreme case, all the code sections in code storage section 112 are replaced with updated code sections. That is, the FSS 110 receives a second plurality of updated code sections (not shown), and the patch library 336 replaces the second plurality of code sections in the code storage section 112 with the second plurality of updated code sections. Of course, the FSS 110 must be large enough to accommodate the second plurality of updated code sections received via the airlink interface.

As noted above, the updated code sections being received may include read-write data code sections, code section address table code sections, symbol libraries, symbol offset address table code sections, symbol accessor code sections, or a code section with a new patch library. All these code sections, with their associated symbol libraries and symbols, may be stored as distinct and independent code sections. Then each of these code sections would be replaced with a unique updated code section. That is, an updated read-write code section would be received and would replace the read-write code section in the code storage section. An updated code section address table code section would be received and would replace the code section address table code section in the code storage section. An updated symbol offset address table code section would be received and would replace the symbol offset address table code section in the code storage section. An updated symbol accessor code section would be received and would replace the symbol accessor code section in the code storage section. Likewise, an updated patch manager code section (with a patch library) would be received and would replace the patch manager code section in the code storage section.

However, the above-mentioned code sections are typically bundled together in the patch manager code section. Thus, the read-write code section in the code storage section is replaced with the updated read-write code section from the file system section 110 when the patch manager code section 308 is replaced with the updated patch manger code section 450. Likewise, the code section address table, the symbol offset address table, the symbol accessor code sections, as well as the patch library are replaced when the updated patch manager code section 450 is installed. The arrangement of the new read-write data, the new code section address table, the new symbol offset address table, the new symbol accessor code, and the new patch library as the updated patch manager code section 450, together with the current code sections in the code storage section, forms updated executable system software.

When the file system section 110 receives an updated symbol accessor code address, the patch manager replaces the symbol accessor code address in the first location in memory with updated symbol accessor code address. As noted above, the first location in memory 334 is typically in the patch manager code section (see FIG. 3).

As seen in FIG. 3, the patch library 308 is also includes a compactor, or a compactor symbol library 342. The compactor 342 can also be enabled as a distinct and independent code section, however as noted above, it is useful and efficient to bundle the functions associated with system software upgrades into a single patch manager code section. Generally, the compactor 342 can be said to resize code sections, so that new sections can be arranged with current code sections in the code storage section 112.

Contrasting FIGS. 3 and 4, the file system section 110 receives a compaction instruction set with instructions for identifying a current code section for updating via the airlink interface 150 (see FIG. 1). For example, the compaction instruction set can be the first PMRTI 454, although the instructions for compaction need not necessarily be bundled with the other updating instructions. The compactor 342 replaces the identified current code section in the code storage section with the new code section. It should be understood that the compactor 342 works in cooperation with the patch library 336 explained above. Alternately stated, the compactor 342 is called upon to assist the patch library 336 in circumstances where code section resizing is required in the process of updating the system software.

The compactor resizes the memory blocks (FIG. 4) in which corresponding resized code sections are stored in the code storage section. For example, the file system section 110 receives a new code section 450 having a first size. At the same time, or in other messages, the wireless device receives a compaction instruction set, say first PMRTI 454, and an updated patch manager code section 452. The compaction instruction set 454 identifies a current code section having a second size, say code section 2 (304), less than the first size. Since the updated code section 450 is larger in size that the code section being replaced, a compaction operation must be performed. The compactor 342 increases the size of the second memory block 402 associated with the identified current code section 304 to at least the first size. The compactor (in cooperation with the patch library 336) replaces the identified current code section 304, stored in the corresponding memory block 402, with the new code section 450.

As noted above, it is common for the code sections to be oversized with respect to the symbol library, or symbol libraries arranged within. The compactor 342 determines the size of symbol libraries arranged within the corresponding code sections, and resizes code sections to more closely match the symbol library sizes arranged within. Typically, the compactor 342 optimally resizes code sections to further subsequent code section resizing and updating operations.

Continuing the example begun above, the compactor 342 might optimally resize code sections by taking unused areas from the code sections adjacent the second memory block 402. As shown, code section one (302), and a code section three (344) have unused areas 340 and 346, respectively. The compactor may choose to resize the first memory block 302 and a third memory block 460, taking from both unused areas 340 and 346 to make the second memory block 402 large enough for the new code section 450.

FIG. 8 is a schematic block diagram illustrating the results of exemplary compacting operation. Code section 2 has been replaced with the larger new (updated) code section 450. The unused section 340 of code section one (302) has been reduced, as has the unused area 360 of code section three (344). Leaving some unused areas in each code section makes for efficient future expansion and compaction operations. For example, if all the unused area 360 were used up to accommodate the updated code section 450 in the current update operation, any future expansion of code section three (344) would necessarily require compaction operations in adjacent code sections. It should also be understood that although the example only shows two adjacent memory blocks being resized, some compaction operations may require that some, or even all of the code sections be resized to accommodate new (larger) code section updates.

The compactor 342 accesses start addresses from code section address table, to measure the code sections sizes, and symbol offset addresses from the symbol offset address table, to measure the size of the symbol libraries arranged within corresponding code sections. Again, it should be understood that in some embodiments the compactor relies upon, and cooperates with other symbol libraries or code sections, that need not necessarily reside in the patch manager code section 308, to accomplish tasks. Preferably, however, the compactor works with the symbol accessor code described above to access the code section address table and symbol offset address table.

Since the code section address table includes the start address of each code section, a simple arithmetic operation using the start addresses of adjacent code sections can determine the size of the code section. Likewise, the address of the last symbol in a symbol library can be used, with the code section start addresses, to determine the approximate size of the symbol libraries arranged within corresponding code sections and, therefore, the amount of unused area. For example, if the start address of code section one (302) is (0100), the start address of code section two (304) is (0200), and the address of the last symbol of symbol library one (310) is (0170), the size of unused area 340 is approximately (0200-0170).

However, many symbols are distributed over several contiguous addresses, and the offset address of the last symbol is not necessarily the same as the address where the symbol library ends. Continuing the above example, if the last symbol begins at address (0170) and ends at (0173), the size of the unused space 340 is actually (0200-0173). In some embodiments the code storage section 112 includes symbol libraries with end symbols to signify the end of symbol libraries. For example, returning momentarily to FIG. 6, symbol "Z" is a one-byte end symbol. That is, the address of symbol "Z" signifies the end of symbol library one. The compactor 342 uses the end symbol offset addresses, through the operation of the symbol accessor code to measure the size of symbol libraries arranged within corresponding code sections.

Alternately, the code storage section 112 includes symbol libraries with size symbols to signify the size of symbol libraries. For example, symbol "Y" (FIG. 6) can be a number (0073) that signifies the size of symbol library one. The compactor 342 accesses the size symbols to measure the size of symbol libraries arranged within corresponding code sections. In other embodiments the size symbols for all the symbol libraries are stored in a table in a distinct code section (not shown) of the patch manager code section.

The compactor 342 measures the size of the new code section 450 in the file system section 110 and first determines if the new code section can be arranged with the current code sections in the code storage section 112. The compactor 342 makes this determination in response to measuring the size of symbol libraries arranged within corresponding code sections, and measuring the size of the new code section. If compaction will not successfully permit the new code section to be installed, the compactor 342 automatically aborts the operation. Alternately, the compactor calculates a probability of success, displays the probability to the wireless device user, and permits the user to determine if the compaction operation should continue. Regardless of the probability of success, the wireless telephone gives the user the option of starting the compaction process, as the compactor 342 must suspend the execution of the system software during the compaction and updating process.

To determine the size of the updated code section, the compactor 342 generally relies upon compaction instruction set data. The file system section 110 receives a compaction instruction set 454 that includes the size of the new code section 450. The compactor 342 accesses the compaction instruction set 454 to determine the size of the new code section 450 in the file system section 110 and determines if the new code section can be arranged with the current code sections in the code storage section 112, in response to measuring the size of symbol libraries arranged within corresponding code sections and determining the size of the new code section.

The compaction operation can be avoided if the code storage section includes large unused memory block sections. The compactor 342 determines the size of unused memory blocks in the code storage section and stores the new code section in the unused memory block, if the size of the unused memory block is greater than, or equal to the new code section size.

Once the code sections have been resized, and the identified code sections replaced with updated code sections, the compactor 342 changes the start addresses of code sections stored in the code storage section. Continuing the above example, if the resizing operation is accomplished by starting the new code section 450 (now code section two) at the start address of (0175), instead of (0200), the code section address table must be changed to reflect the new start address.

FIGS. 9a through 9e illustrate the operation of an exemplary compaction schedule. After the compactor 342, operating from volatile memory 114, calculates the probability of successful compaction, and calculates the code section sizes, the compactor 342 generates a compaction schedule. The compaction schedule includes the order in which code sections are moved, and their temporary placement in the FSS 110. The file system section 110 temporarily stores code sections from the code storage section 112, and the compactor 342 stores the code sections from the file system section 110 into the code storage section 112 memory blocks to maintain contiguous addressing, in response to the compaction schedule.

Figure 9A:
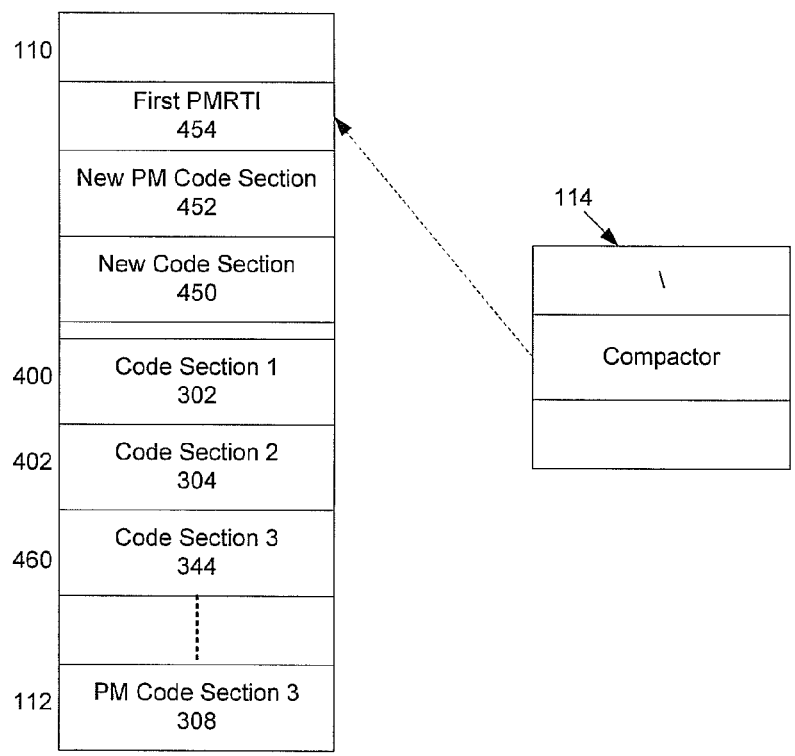
FIGS. 9a through 9e illustrate the operation of an exemplary compaction schedule.
Figure 9B:
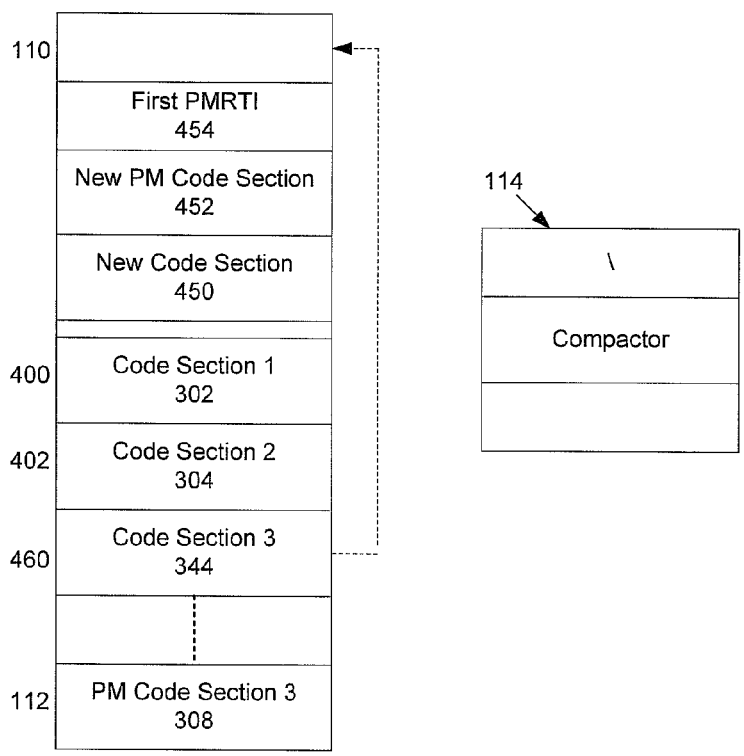

Continuing the example begun above, in FIG. 9a the compactor 342 consults the compaction instruction set (first PMRTI) 454 to determine the code section to be updated and the size of the new code section 450. In FIG. 9b, the compactor 342, after calculating the probability of success and size of the code sections, begins the process by moving code section three (344) to FSS 110 from the third memory block 460.

Figure 9C:
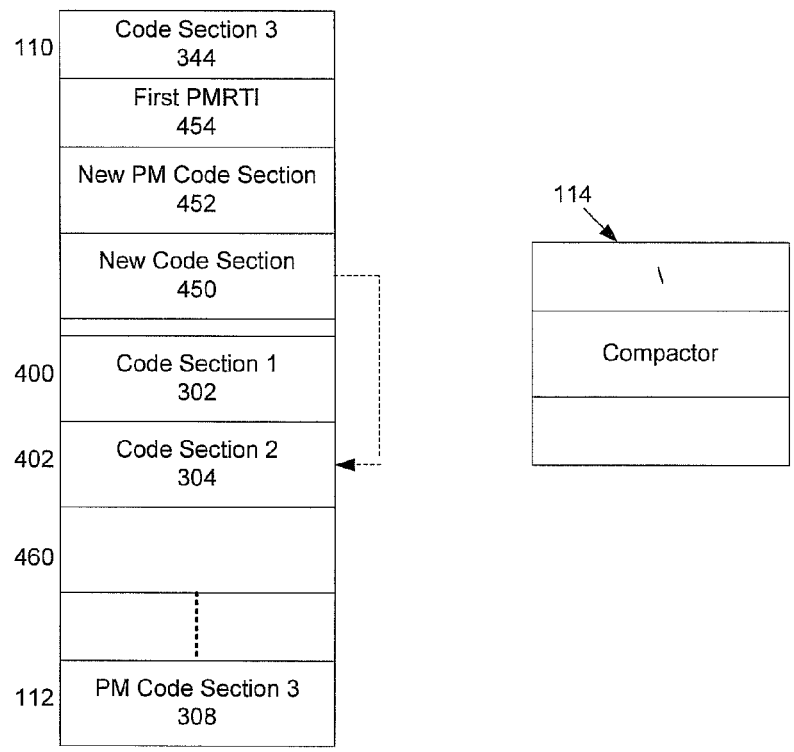

In FIG. 9c, the new code section 450 is moved from FSS 110 to the second memory block 402. If code section one (302) has been resized, the compactor 342 causes the start address of the new code section to begin in the unused area 340 (see FIG. 3). As mentioned above, the start of the second memory block changes from (0200) to (0175). That is, code section one (302) has been compacted.

Figure 9D:
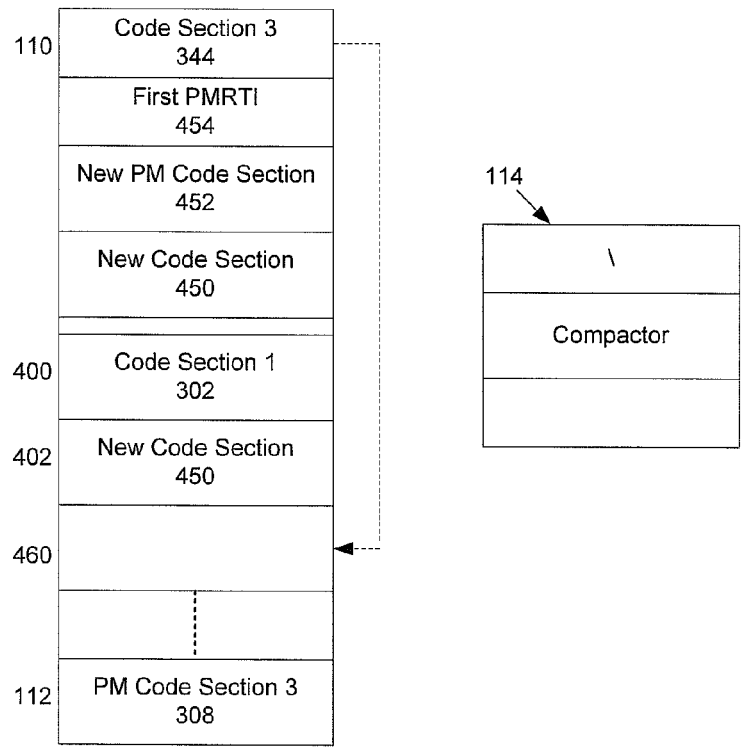

In FIG. 9d, code section three (344) is moved back from FSS 110 to the third memory block 460. The move is made to start code section three (344) at a new start address. Starting the code section at a new start address may involve compacting the code section. That is, some of the unused area 346 may be used.

Figure 9E:
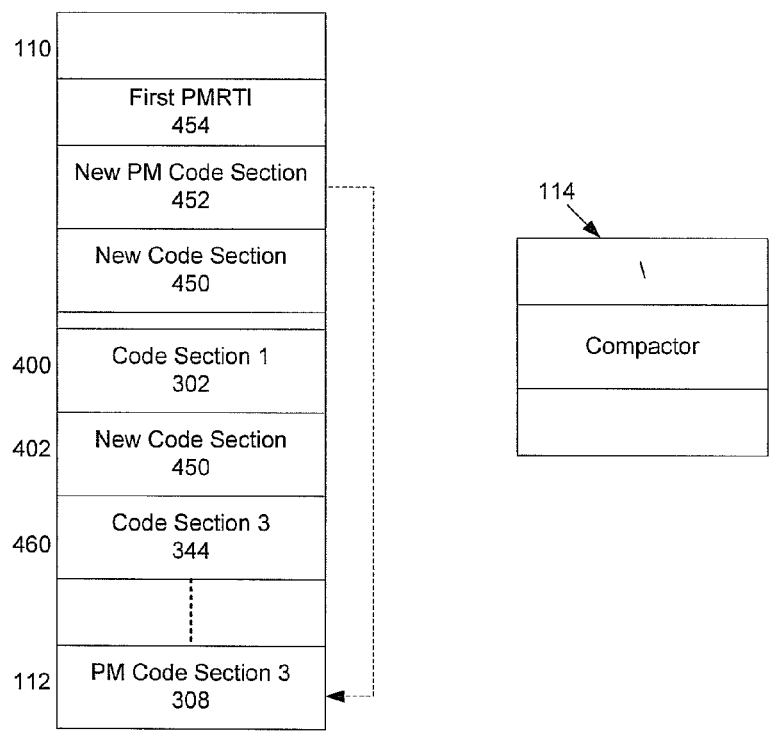

In FIG. 9e, the patch manager (PM) code section 308 is replaced with the new (updated) PM code section 452. Typically, the patch manager includes the code section address table code symbol library (see FIG. 3). However, the updated code section address table is not necessarily correct, as the results of compaction are not necessarily known beforehand. Then, the compactor 342 generates an updated code section address table, in response to changing the start addresses of code sections stored within the memory blocks. The compactor 342 overwrites the updated code section address table stored in the code storage section 112 with the updated code section address table that it has generated. Then, the updated system software accesses the updated code section address table after the new code section is arranged with the current code sections.

However, the symbol offset address table is handled differently, since the symbol offset addresses for updated and current code sections can be calculated beforehand. The file system section 110 receives a new code section, typically the PM code section 452, with an updated symbol offset address table, and the updated system software accesses the updated symbol offset address table after the new code section 452 is arranged with the current code sections.

Much of the above description has been devoted to the operation of the compactor in calculating code section sizes and a compaction schedule. However, in some embodiments the compactor 342 is relieved of the responsibility of these calculations. In one embodiment the file system section 110 receives a compaction instruction 454 set including code section resizing instructions and a compaction schedule. Then, the compactor 342 resizes code sections in response to the code section resizing instructions. As before, the file system section 110 temporarily stores code sections from the code storage section 112, and the compactor 342 stores the code sections from the file system section 110 into the code storage section 112 memory blocks to maintain contiguous addressing, in response to the compaction schedule.

The file system section 110 also receives a new code section, for example the updated PM code section 452, with an updated code section address table and an updated symbol offset address table. Since the code section resizing and compaction schedule were calculated beforehand (not by the wireless device), these updated tables accurately reflect the new code section start addresses. The updated system software accesses the updated symbol offset address table and updated code section address table after the new code section is arranged with the current code sections.

As best illustrated in FIG. 1, the volatile memory 114 includes the first and second table code sections (the code section address table and symbol offset address table) loaded from the code storage section 112 for executing the system software. Other critical libraries from the patch manager code section 308 are also loaded into volatile memory 114. The new code sections are arranged with the current code sections in the code storage section 112 to form updated system software, following a reset of the wireless communications device 104. When reset, the updated code section address table and updated symbol offset address table are loaded into the volatile memory 114, and the system software can then be executed with the updated tables.

Figure 10A:
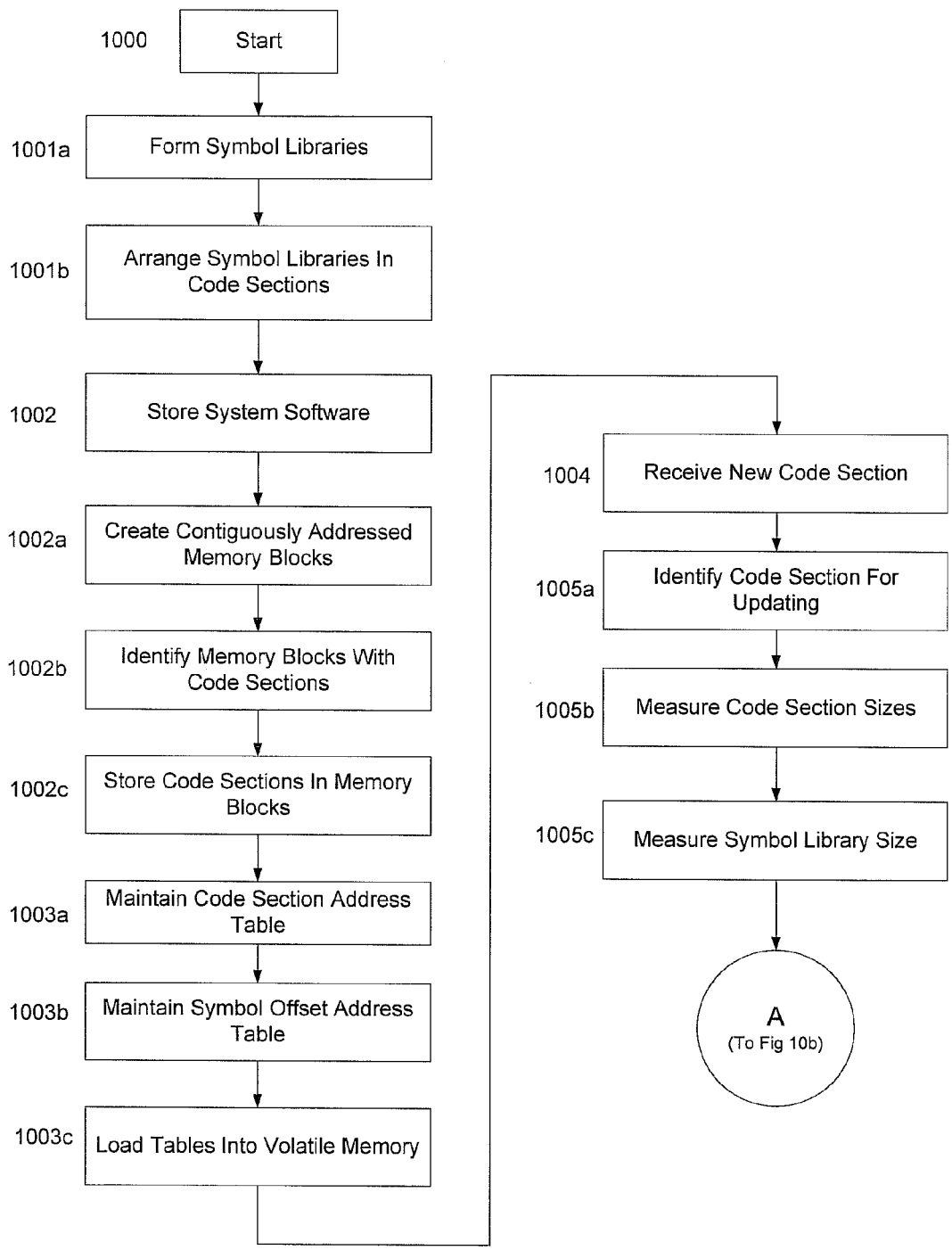
FIGS. 10a through 10b are a flowchart illustrating a method for reorganizing software instructions stored in a wireless communications device memory.
Figure 10B:
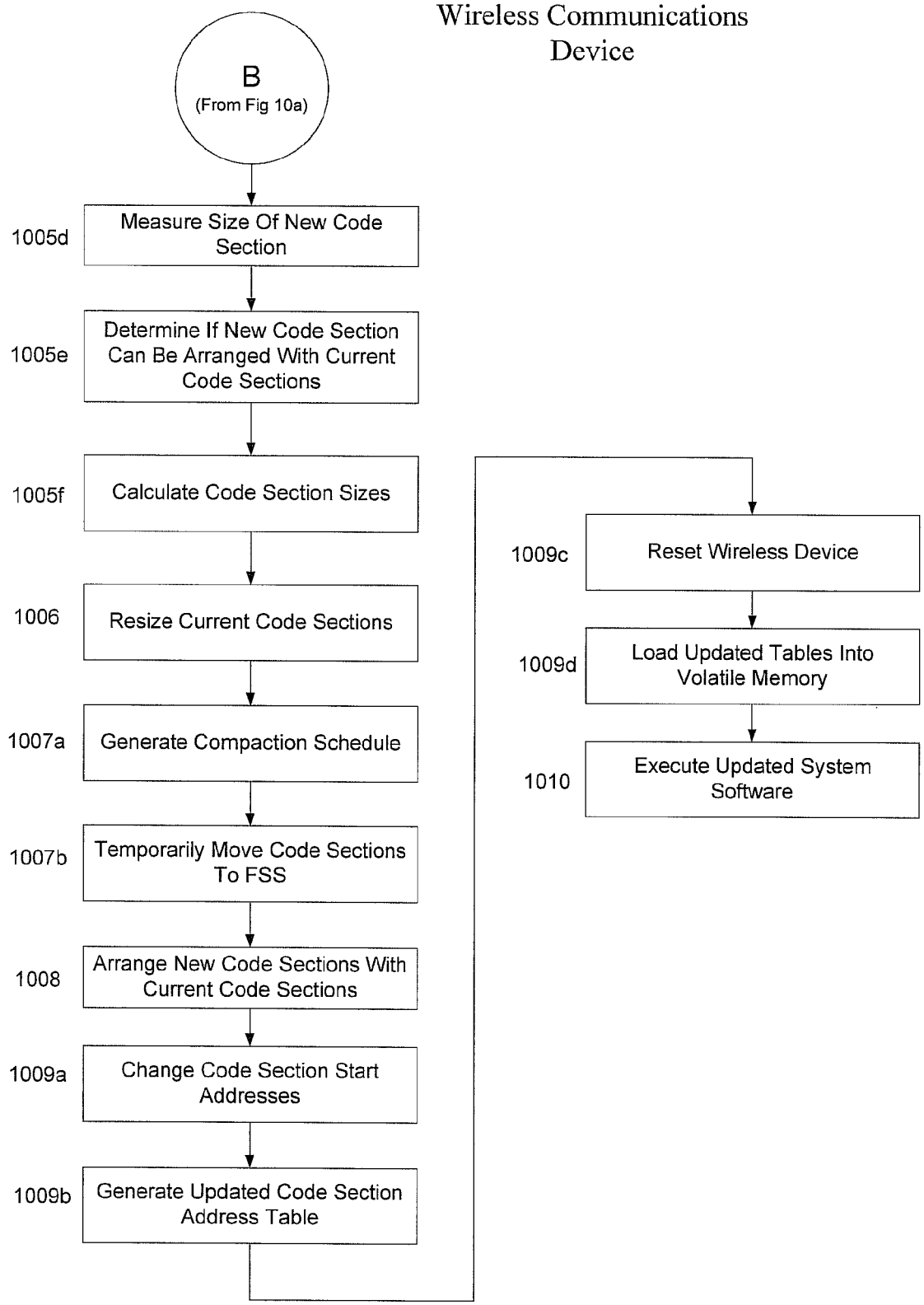

FIGS. 10a through 10b are a flowchart illustrating a method for reorganizing software instructions stored in a wireless communications device memory. Although depicted as a sequence of numbered steps for clarity, no order should be inferred from the numbering unless explicitly stated. The method begins at Step 1000. Step 1001a forms the system software into a first plurality of symbol libraries, each symbol library comprising at least one symbol. Step 1001b arranges the first plurality of symbol libraries into a second plurality of code sections. Step 1002 stores wireless device system software in a plurality of current code sections. Step 1004 receives a new code section. Receiving a new code section in Step 1004 includes receiving the new code section via a wireless communications device air interface.

Step 1006 resizes current code sections. Typically, resizing current code sections includes suspending the operation of the system software. Step 1008 arranges the new code section with the current code sections to form updated system software for the wireless device. Step 1010 executes the updated system software. Typically, Step 1005*a* identifies a current code section for updating, and arranging the new code section with the current code sections to form updated system software in Step 1008 includes replacing the identified current code section with the new code section.

Arranging the first plurality of symbol libraries into a second plurality of code sections in Step 1001*b* includes starting symbol libraries at the start of code sections. Storing wireless device system software in a plurality of current code sections in Step 1002 includes storing the start of code sections at corresponding start addresses. Then, the method comprises a further step. Step 1003*a* maintains a code section address table cross-referencing code section identifiers with corresponding start addresses.

Arranging the first plurality of symbol libraries into a second plurality of code sections in Step 1001*b* includes arranging symbols to be offset from their respective code section start addresses. Then, Step 1003*b* maintains a symbol offset address table cross-referencing symbol identifiers with corresponding offset addresses, and corresponding code section identifiers.

Storing the start of code sections at corresponding start addresses includes substeps. Step 1002*a* creates a second plurality of contiguously addressed memory blocks. Step 1002*b* identifies each memory block with a corresponding code section. Step 1002*c* stores code sections in the identified memory blocks.

Arranging the first plurality of symbol libraries into a second plurality of code sections in Step 1002 includes sizing the code sections to accommodate arranged symbol libraries. Creating a second plurality of contiguously addressed memory blocks in Step 1002*a* includes sizing memory blocks to accommodate corresponding code sections. Typically, sizing memory blocks to accommodate corresponding code sections includes sizing the code sections to accommodate sizes larger than the arranged symbol libraries. Resizing current code sections in Step 1006 includes resizing the memory blocks in which corresponding resized code sections are stored.

For example, receiving a new code section in Step 1004 includes receiving a new code section having a first size. Identifying a current code section for updating in Step 1005*a* includes identifying a current code section having a second size, less than the first size. Then, resizing the memory blocks in which corresponding resized code sections are stored in Step 1006 includes substeps. Step 1006*a* (not shown) increases the size of a memory block associated with the identified current code section to at least the first size, and Step 1006*b* (not shown) replaces the identified current code section, stored in the corresponding memory block, with the new code section.

Resizing the memory blocks in which corresponding resized code sections are stored in Step 1006 includes, in response to measuring the size of the symbol libraries arranged within corresponding code sections (see Step 1005*c*, below), resizing code sections to more closely match the symbol library sizes arranged within. Resizing code sections to more closely match the symbol library sizes arranged within in Step 1006 includes optimally resizing code sections to further subsequent code section resizing and updating operations.

Step 1005*b*, using the start addresses from code section address table, measures the current code sections sizes. Step 1005*c*, using the symbol offset addresses from the symbol offset address table, measures the size of the symbol libraries arranged within corresponding code sections. That is, the code section sizes and sizes of the symbol libraries are measured. This information permits the amount of unused area in each code section to be calculated.

In some aspects, forming the system software into a first plurality of symbol libraries in Step 1001*a* includes forming end symbols to signify the end of symbol libraries. Then, measuring the size of the symbol libraries arranged within corresponding code sections in Step 1005*c* includes using the offset addresses of the end symbols to measure the size of symbol libraries. Alternately, forming the system software into a first plurality of symbol libraries in Step 1001*a* includes forming size symbols to signify the size of symbol libraries. Then, measuring the size of the symbol libraries arranged within corresponding code sections in Step 1005*c* includes accessing the size symbols to measure the size of symbol libraries.

Step 1005*d* measures the size of the new code section. Step 1005*e*, in response to measuring the size of symbol libraries arranged within corresponding code sections in Step 1005*c*, and measuring the size of the new code section in Step 1005*d*, determines if the new code section can be arranged with the current code sections.

In some aspects, determining if the new code section can be arranged with the current code section in Step 1005*e* includes determining the size of unused memory blocks. Then, arranging the new code section with the current code sections to form updated system software for the wireless device in Step 1008 includes storing the new code section in the unused memory block, if the size of the unused memory block is greater than, or equal to the new code section size.

Step 1005*f* calculates the code section sizes. That is, a determination is made of new code sections sizes that will permit the new code section to be arranged with the current code sections. Step 1007*a*, in response to calculating the code section sizes, generates a compaction schedule. Step 1007*b* temporarily moves code sections into a file system section. Then, arranging the new code section with the current code sections to form updated system software for the wireless device in Step 1008 includes storing the code sections from the file system section into the memory blocks to maintain contiguous addressing, in response to the compaction schedule.

Following the resizing of the code sections in Step 1006, Step 1009*a* changes the code section start addresses. Step 1009*b*, in response to changing the start addresses of code sections stored within the memory blocks, generates an updated code section address table. Then, executing the updated system software in Step 1010 includes using the updated code section address table after arranging the new code section with the current code sections.

In some embodiments receiving a new code section in Step 1004 includes receiving a new code section with an updated symbol offset address table. Then, executing the updated system software in Step 1010 includes using the updated symbol offset address table after arranging the new code section with the current code sections.

Step 1003*c* loads the code section address table and symbol offset address table into a volatile memory. Step 1003*d* (not shown), in response to loading the code section address table and symbol offset address table into the volatile memory, executes system software. Step 1009*c* resets the wireless communications device. Step 1009*d*, in response to resetting, loads the updated code section address table and the updated symbol offset address table into volatile memory. Step 1010, in response to loading the updated code section address table and updated symbol offset address table into memory, executes the updated system software.

Figure 11:
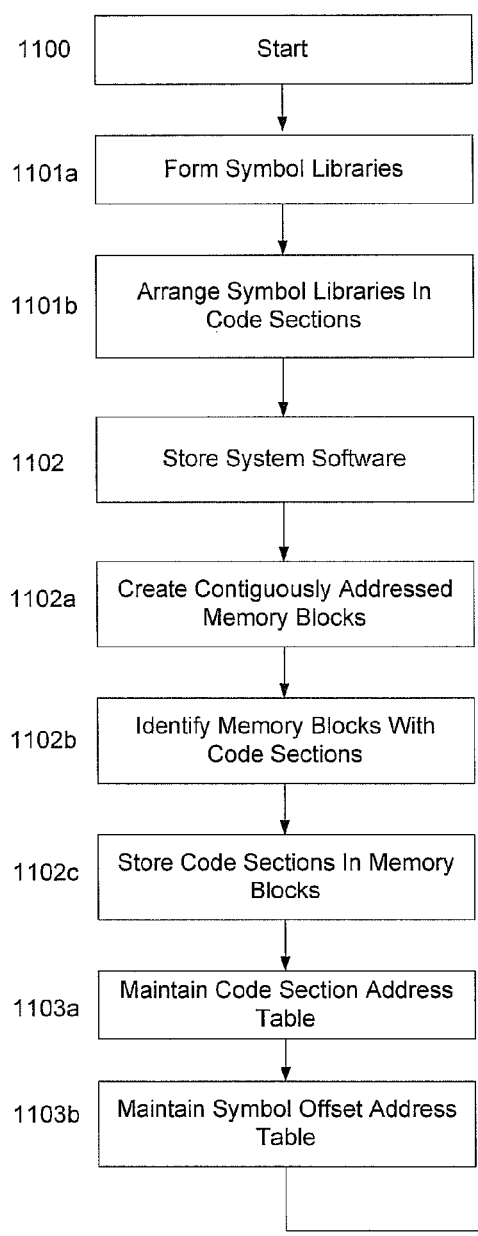
FIG. 11 is a flowchart illustrating an alternate aspect of the method of FIGS. 10a through 10b.
Figure 11:
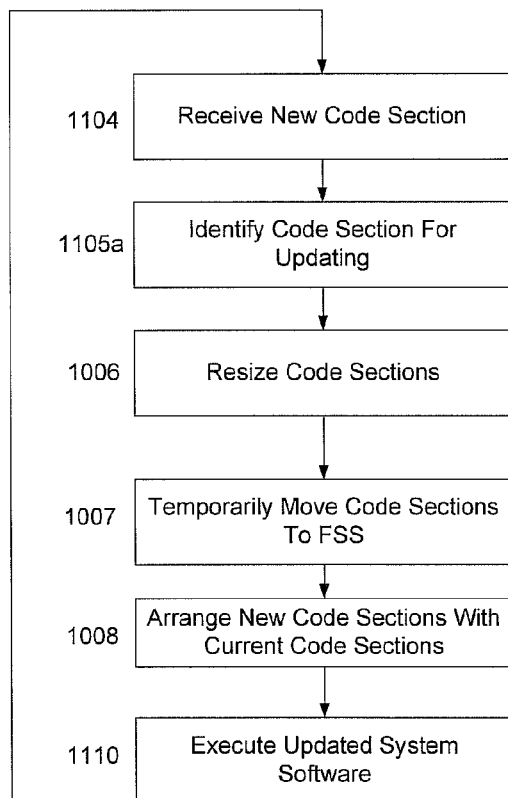

FIG. 11 is a flowchart illustrating an alternate aspect of the method of FIGS. 10a through 10b. FIG. 11 shares several steps in common with FIGS. 10a and 10b, which for the sake of brevity are repeated here. Receiving a new code section in Step 1104 includes receiving a compaction instruction set including code section resizing instructions and a compaction schedule. Resizing current code sections in Step 1106 includes resizing in response to the code section resizing instructions.

Step 1107 temporarily moves code sections into a file system section. Then, arranging the new code section with the current code sections to form updated system software for the wireless device in Step 1008 includes storing the code sections from the file system section into memory blocks to maintain contiguous addressing, in response to the compaction schedule.

Receiving a new code section in Step 1104 includes receiving a new code section with an updated code section address table and an updated symbol offset address table. Then, executing the updated system software in Step 1110 includes using the updated code section address table and updated symbol offset address table after arranging the new code section with the current code sections.

A system and method have been provided for reorganizing system software structure in a wireless communications device so aid in the process of updating the software. The system is easily updateable because of the arrangement of symbol libraries in code sections, with tables to access the start addresses of the code sections in memory and the offset addresses of symbols in the symbol libraries. Although a few examples of these library arrangements and cross-referencing tables have been given for a display function, the presently disclosed concepts are not limited to just these examples. Other variations and embodiments will occur to those skilled in the art.

What is claimed is:

1. A method for maintaining software, the method comprising:
   receiving software over-the-air (OTA), by a wireless communications device having system software stored in a memory operably disposed in the wireless communications device, the system software comprising a plurality of first code sections;
   storing received OTA software in at least one second code sections;
   performing a compaction operation comprising:
      correlating the first code sections with the second code sections for replacement of the first code sections;
      selecting at least one first code section for compaction and
      producing a compacted first code section;
      replacing correlated first code sections with correlated second code sections; and,
      executing the changed system software after the replacement has been completed.

2. The method of claim 1 further comprising:
   storing the received OTA software in a file system, the file system comprised of code sections.

3. The method of claim 1 further comprising:
   determining that at least one system software code section, of said plurality of first code sections, can be reduced in size;
   saving an indication of said at least one system software code section;
   scheduling a maintenance event including the saved indication.

4. The method of claim 3 further comprising:
   performing a compaction operation, as part of the maintenance event, to reduce the size of said at least one system software code section using the saved indication.

5. The method of claim 4 further comprising:
   relocating at least one code section so that there is at least one contiguous section of available memory that is larger than before the relocating.

6. The method of claim 1 wherein performing the compaction operation further comprises
   determining that a correlated second code section, that is larger than a corresponding correlated first code section, can be arranged in unused memory blocks to form a new code section; and,
   arranging the second code section in the unused memory blocks to form the new code section and forming executable system software.

7. The method of claim 1, wherein performing the compaction operation further comprises:
   selecting at least one downsizable first code section;
   downsizing the at least one downsizable first code section, the downsizing resulting in available memory;
   including the available memory in a code section needing to be upsized.

8. The method of claim 7, further comprising:
   relocating at least one other code section located, in memory, between the available memory and the code section needing to be upsized so that after the relocating, the available memory and the memory storing the code section needing to be upsized are contiguous.

9. A method for maintaining software comprising:
   receiving Over-the-Air (OTA) software using an OTA interface;
   storing the OTA software in a file system comprised of OTA code sections;
   determining at least one system code section, in a wireless communication device memory storing a plurality of system code sections, to be resized to use less memory space;
   scheduling a maintenance event;
   starting the maintenance event;
   using a compactor after starting the maintenance event to resize the at least one system code section, comprising:
      correlating the at least one system code section with at least one OTA code section for replacement of the at least one system code section;
      selecting the at least one system code section for compaction and
      producing a compacted system code section;
      replacing correlated system code sections with correlated OTA code sections; and
   xecuting system software, comprising said plurality of system code sections, after resizing the at least one system code section.

10. The method of claim 9 further comprising:
    relocating a system code section so that there is at least one contiguous section of available memory that is larger than before the relocating.

11. The method of claim 10 wherein an OTA code section uses the contiguous section of available memory.

12. The method of claim 10 where the relocating further comprises relocating a plurality of system code sections so that after the relocating, the memory recovered from the downsized system code sections forms contiguous available memory.

13. A wireless communications device comprising:
an over-the-air (OTA) interface operable to send and receive OTA communications;
a memory;
system software instructions stored in the memory, the system software instructions organized into a plurality of system code sections, the system software being executable and configured to enable the wireless communications device to be operable, including interacting with the OTA interface, each system code section comprised of contiguously addressable memory blocks;
a file system section for receiving OTA code sections via the OTA interface, including a compaction instruction set identifying corresponding code sections, the corresponding code sections being an OTA code section and a system code section it will replace; and
a compactor configured to compare sizes between corresponding code sections, to upsize system code sections to accommodate corresponding OTA code sections if the OTA code section is larger than its corresponding system code section, to copy OTA code sections into resized system code sections, to copy OTA code sections into unchanged system code sections where no upsizing is needed, and, wherein the arrangement of new code sections forms executable updated system software.

14. The wireless communications device of claim 13 where the compactor is further configured to:
determine if any of system software code sections can be reduced in size after the forming of the updated executable system software;
save indication of which code sections may be reduced in size; and,
schedule a maintenance event, the maintenance event comprising the saved indications.

15. The wireless communications device of claim 14 where the compactor is further configured to start the maintenance event in accordance with the schedule, and, to reduce the size of code sections indicated by the indications.

16. The wireless communications device of claim 15 where the compactor is further configured to relocate at least one code section resulting in a contiguous section of available memory that is larger than before the relocating.

17. The wireless communications device of claim 13 where the compactor is further configured to determine if an OTA code section that is larger than its corresponding system code section can be arranged in unused memory blocks, resulting in a new code section, and where the new code section forms part of the system software.

18. The wireless communications device of claim 13 where the compactor is further configured to:
select at least one downsizable system code section;
downsize the at least one downsizable system code section, the downsizing resulting in available memory;
including the available memory in a system code section needing to be upsized.

19. The wireless communications device of claim 18 where the compactor is further configured to relocate at least one other system code section located, in memory, between the available memory and the code section needing to be upsized so that after the relocation, the available memory and the memory storing the code section needing to be upsized are contiguous.

* * * * *